(12) United States Patent
Chen et al.

(10) Patent No.: US 9,173,134 B2
(45) Date of Patent: Oct. 27, 2015

(54) METHOD AND APPARATUS FOR MANAGING QUALITY OF SERVICE SETTINGS FOR GROUP COMMUNICATIONS

(75) Inventors: Ethan Y. Chen, Wilmette, IL (US); Anatoly Agulnik, Deerfield, IL (US); Frank F. Liang, Lisle, IL (US); Wei Mao, Palatine, IL (US); Trent J. Miller, West Chicago, IL (US); Francesca Schuler, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 243 days.

(21) Appl. No.: 13/305,938

(22) Filed: Nov. 29, 2011

(65) Prior Publication Data

US 2013/0136036 A1     May 30, 2013

(51) Int. Cl.
*H04W 28/24* (2009.01)
*H04L 12/911* (2013.01)
*H04L 12/927* (2013.01)

(52) U.S. Cl.
CPC .............. *H04W 28/24* (2013.01); *H04L 47/828* (2013.01); *H04L 47/805* (2013.01); *H04L 47/824* (2013.01)

(58) Field of Classification Search
CPC ... H04L 47/765; H04L 47/781; H04L 47/805; H04L 47/828; H04W 28/0268; H04W 72/0486; H04W 72/08
USPC .................. 370/260, 312, 329–338, 465, 468
See application file for complete search history.

(56) References Cited

U.S. PATENT DOCUMENTS

| | | | |
|---|---|---|---|
| 7,653,735 B2 | 1/2010 | Mandato et al. | |
| 7,853,983 B2 | 12/2010 | Abrutyn et al. | |
| 7,929,475 B2 | 4/2011 | Simonson et al. | |
| 7,974,650 B2 | 7/2011 | Chowdhury et al. | |
| 2006/0158510 A1* | 7/2006 | Lia et al. | 348/14.08 |
| 2007/0061398 A1* | 3/2007 | Forssell | 709/204 |
| 2009/0005100 A1 | 1/2009 | Copeland | |

(Continued)

FOREIGN PATENT DOCUMENTS

| | | |
|---|---|---|
| EP | 2385721 A1 | 11/2011 |
| WO | 2010056158 A1 | 5/2010 |

(Continued)

OTHER PUBLICATIONS

TIA Standard 102.BACA-A; Project 25, Inter-RF Subsystem Interface Messages and Procedures for Voice and Mobility Management Services; Jan. 22, 2009.

(Continued)

*Primary Examiner* — Pao Sinkantarakorn
(74) *Attorney, Agent, or Firm* — Steven A. May

(57) ABSTRACT

A centralized quality of service (QoS) entity having a processing device performs a method for managing QoS settings for group communications. The method includes: determining a plurality of active participants of a group communication session; and determining, for each active participant, an individual QoS setting, including a first individual QoS setting for a first active participant. The method further includes modifying the first individual QoS setting based on the individual QoS setting for at least one other active participant, wherein the modified first individual QoS setting is applied to a session leg used by the first active participant during the group communication session. The active participants of the group communication session can be on the same or heterogeneous wireless networks.

14 Claims, 8 Drawing Sheets

(56) References Cited

U.S. PATENT DOCUMENTS

2011/0111729 A1* 5/2011 Poltorak et al. .............. 455/406
2012/0140632 A1* 6/2012 Norp et al. ................... 370/235
2013/0051326 A1   2/2013 Jeyatharan et al.

FOREIGN PATENT DOCUMENTS

WO   2010148033 A2   12/2010
WO   2011135800 A1   11/2011

OTHER PUBLICATIONS

International Search Report and Written Opinion for International Patent Application No. PCT/US2012/62596 mailed Apr. 5, 2013.
"3rd Generation Partnership Project; Technical Specification Group Services and System Aspects; Policy and charging control architecture (Release 9)" 3GPP Standard; 3GPP TS 23.203, No. V9.1.0, Jun. 1, 2009, pp. 1-116.

* cited by examiner

METHOD AND APPARATUS FOR MANAGING QUALITY OF SERVICE SETTINGS FOR GROUP COMMUNICATIONS

FIELD OF THE DISCLOSURE

The present disclosure relates generally to quality of service (QoS) differentiation in communication systems and, in particular, to a method and apparatus for managing QoS settings for group communications.

BACKGROUND

As mobile broadband users (also referred to herein as subscribers), services, and traffic volume have grown rapidly in recent years, QoS frameworks or mechanisms have been developed to enable quality of service differentiation for different applications, subscribers, bearers, or Service Data Flows (SDFs). As used herein, QoS is defined as the collective effect of service performance which determines the degree of satisfaction of a user of a service and is characterized by the combined aspects of performance factors applicable to all services. Such performance factors include, but are not limited to, service operability performance, service accessibility performance, service retainability performance, service integrity performance, and other factors specific to each service.

In current QoS frameworks, the QoS differentiation is affected by assigning values to one or more QoS parameters, wherein these QoS parameter values make up and define a "QoS setting" or "QoS profile." For example, $3^{rd}$ Generation Partnership Project (3GPP) has standardized, in a suite of technical specifications (TS) (referred to herein as 3GPP TSs), an Evolved Packet System (EPS) that includes an all-Internet Protocol (IP) Evolved Packet Core (EPC) network used by mobile devices (also referred to herein as user equipment (UE)) attached to a radio access network (RAN) to send user traffic. The 3GPP TSs further describe and define a 3GPP QoS framework for use within the 3GPP EPS, which implements service level (i.e. per SDF or per SDF aggregate) QoS parameters of QoS Class Identifier (QCI), Allocation and Retention Priority (ARP), Guaranteed Bit Rate (GBR) and Maximum Bit Rate (MBR) to apply QoS differentiation to different bearers used by UE sending traffic over the EPS.

A benefit of the 3GPP QoS framework is that it standardizes (via the assignment of pre-defined QCI values) a mechanism for packet forwarding treatment that an SDF aggregate receives edge-to-edge between the UE and a Policy and Charging Enforcement Function (PCEF) within the EPS, in terms of the performance characteristics of resource type (GBR or non-GBR), priority, packet delay budget, and packet loss rate. The 3GPP QoS framework further beneficially standardizes (via the assignment of pre-defined ARP values) a mechanism for differentiation in priority level, pre-emption capability, and pre-emption vulnerability of different SDFs. The 3GPP QoS framework sufficiently affects QoS differentiation for point-to-point communications between UEs. However, current QoS frameworks (including the 3GPP QoS framework) are inadequate for addressing the more complicated QoS differentiation issues that arise within the group communication context, for instance within a group communication session formed during a public safety emergency or other event.

Accordingly, there is a need for a method and apparatus for managing QoS settings for group communications.

BRIEF DESCRIPTION OF THE DRAWINGS

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

Figure 1:
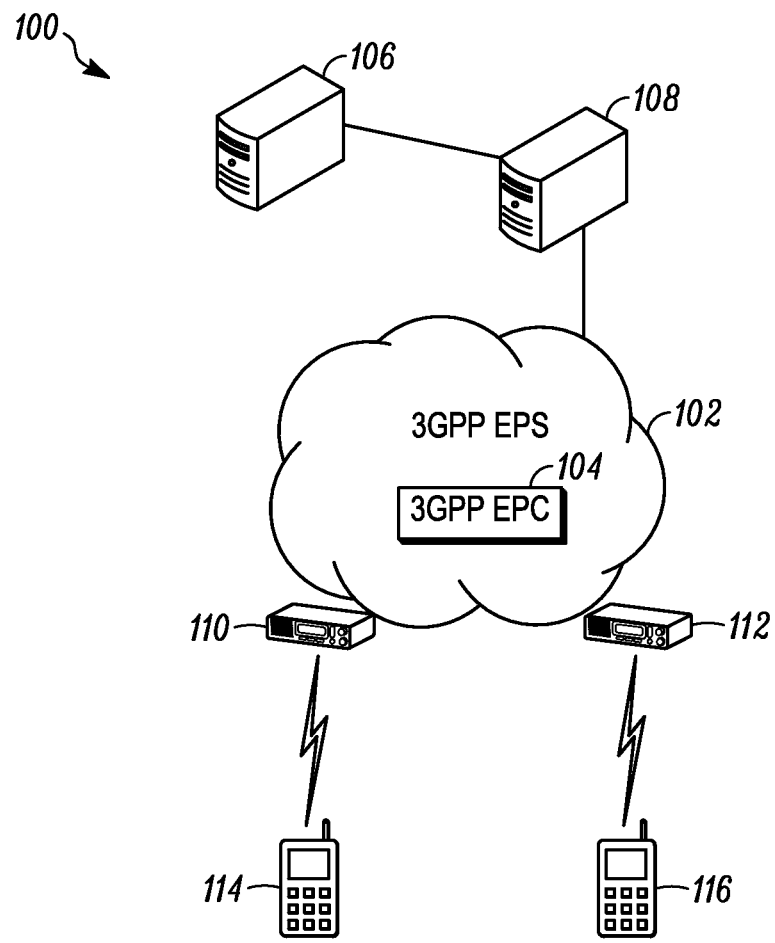
FIG. 1 illustrates a communication system implementing embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method and apparatus for managing QoS settings for group communications. In accordance with the present teachings, a method performed by a centralized QoS entity includes determining a plurality of active participants of a group communication session. As used herein, a plurality means more than one. The method further includes determining, for each active participant, an individual QoS setting, including a first individual QoS setting for a first active participant. Moreover, the method includes modifying the first individual QoS setting based on the individual QoS setting for at least one other active participant, wherein the modified first individual QoS setting is applied to a session leg used by the first active participant during the group communication session. As used herein, a session leg is associated with one or more access network resources used to convey user traffic between a user equipment (UE) and the wireless network. The access network resource(s) may be unicast (point-to-point), multicast (point-to-multipoint), broadcast (point-to-multipoint) or a mixture thereof.

Further in accordance with the present teachings is a non-transient computer readable storage element which stores computer readable code. The stored computer readable code programs a computer to perform a method for managing QoS settings for group communications. The method includes determining a plurality of active participants of a group communication session, and determining, for each active participant, an individual QoS setting, including a first individual QoS setting for a first active participant. Furthermore, the method includes modifying the first individual QoS setting based on the individual QoS setting for at least one other active participant, wherein the modified first individual QoS setting is applied to a session leg used by the first active participant during the group communication session. Modifying the first individual QoS setting based on the individual QoS setting for at least one other active participant comprises at least one of: (1) changing a QCI value of the first individual QoS setting to a highest QCI that is determined from the individual QoS settings of the remaining active participants; (2) changing the QCI value of the first individual QoS setting to a weighted QCI value that is derived from the individual QoS settings of all the active participants; (3) changing an ARP value of the first individual QoS setting to a highest ARP that is determined from the individual QoS settings of the remaining active participants; or (4) changing the ARP value of the first individual QoS setting to a weighted ARP value that is derived from the individual QoS settings of all the active participants.

Further in accordance with the present teachings, a method performed by a centralized QoS entity includes determining a plurality of active participants of a group communication session. The plurality of active participants includes a first active participant operating on a first network and a second participant representing a group on a second network that is a different type of network than the first network. The group has an assigned group priority on the second network. The method further includes determining, for each active participant, an individual QoS setting on the first network, including a first individual QoS setting for the first active participant and a second individual QoS setting for the second active participant. The second individual QoS setting is determined by applying a mapping function to the assigned group priority. Moreover, the method includes modifying the first individual QoS setting based on the second individual QoS setting, wherein the modified first individual QoS setting is applied to a session leg used by the first active participant during the group communication session.

Referring now to the drawings, and in particular FIG. 1, an illustrative communication system implementing embodiments in accordance with the present teachings is shown and indicated generally at 100. System 100 comprises a wireless network (in this implementation a 3GPP EPS) 102, a 3GPP EPC 104, an application server 106, a centralized QoS entity 108, two eNodeBs (Long Term Evolution (LTE) base stations) 110 and 112, and two UEs 114 and 116. Only a limited number of system elements 104 to 116 are shown for ease of illustration; but additional such elements may be included in the communication system 100. Moreover, other components needed for a commercial embodiment of the system 100 are omitted from the drawing for clarity in describing the enclosed embodiments. Furthermore, in this illustrative implementation, communication system 100 is a 3GPP communication system meaning that the system elements 104-116 are configured to operate in compliance with one or more aspects of the 3GPP TSs. However, the teachings herein are applicable to any communication system having a wireless network that provides for a QoS mechanism that is adaptable for group communications. For example, the present teachings are applicable to $3^{rd}$ Generation Partnership Project 2 (3GPP2) and Worldwide Interoperability for Microwave Access (WiMAX) communication systems.

A wireless network is defined herein to include a core network and a RAN. In this illustrative 3GPP implementation, the wireless network 102 is a 3GPP EPS that includes a 3GPP EPC 104 (such as a LTE core network) having all the functional elements (e.g. a Policy and Charging Rules Function (PCRF), a Packet Data Network Gateway (PDN Gateway) having a PCEF, a Mobility Management Entity (MME), a Serving Gateway, etc.) and associated reference points (e.g. Rx, Gx, S5, SGi, S11, etc.) referred to in the 3GPP TSs and needed to facilitate communications between UE as well as to affect QoS differentiation in accordance with the present teachings. The 3GPP EPS 102 further includes a RAN (in this case an evolved Universal Terrestrial Radio Access Network (e-UTRAN)) having one or more eNodeB, e.g. eNodeBs 110 and 112, to which the UEs (e.g. UE 114 and 116) attach to communicate using the 3GPP EPS 102.

The application server 106 hosts one or more applications, such as video conferencing and real-time video streaming, push-to-talk (PTT), Voice over IP (VoIP) conferencing, text messaging applications, etc. for subscribers. Multiple applications may be physically housed in a single server or distributed across multiple servers. Moreover, in one illustrative implementation, the server 106 is included as part of the infrastructure of an enterprise network, such as one operated by a public safety agency and, thereby, may include one or more public safety related applications such as a Computer Aided Dispatch (CAD) application.

The centralized QoS entity 108 is configured to perform methods in accordance with the present teachings to manage QoS settings for group communication, such as methods illustrated and described below by reference to FIGS. 2-4. A centralized QoS entity is defined herein as an entity that physically resides outside of the hardware of the UEs for which the centralized QoS entity is managing QoS settings during a given group communication session. In the example implementation shown in FIG. 1, the centralized QoS entity 108 is embodied within a stand-alone physical platform. Alternatively, the centralized QoS entity 108 shares a physical platform with an infrastructure device within the 3GPP EPS 102, such as an infrastructure device housing the PCRF, or within an infrastructure device within the enterprise network.

In a further implementation, the communication system 100 may include one or more databases or bandwidth management entities (not shown) coupled to the centralized QoS entity 108, which provide relevant data such as individual QoS settings (and modifications to such settings) and identification of active participants of a group communication session, which is used by the centralized QoS entity 108 to perform its QoS modification functionality in accordance with the present teachings. A bandwidth management entity is used, for instance, when multiple enterprise networks share the same centralized QoS entity and the same access network.

The UE 114 and 116 are mobile communication devices that facilitate communication of media to users, when the UEs are attached to the RAN. The UEs are also commonly referred to in the art as mobile devices, access devices, access terminals, mobile stations, mobile subscriber units, subscriber units, user devices, and the like, and can be any type of communication device such as radios, mobile phones, mobile data terminals, Personal Digital Assistants (PDAs), laptops, two-way radios, cell phones, etc. As shown, UE 114 is attached to 3GPP EPS 102 through eNodeB 110 while UE 116 is attached to 3GPP EPS 102 through eNodeB 112.

Figure 2:
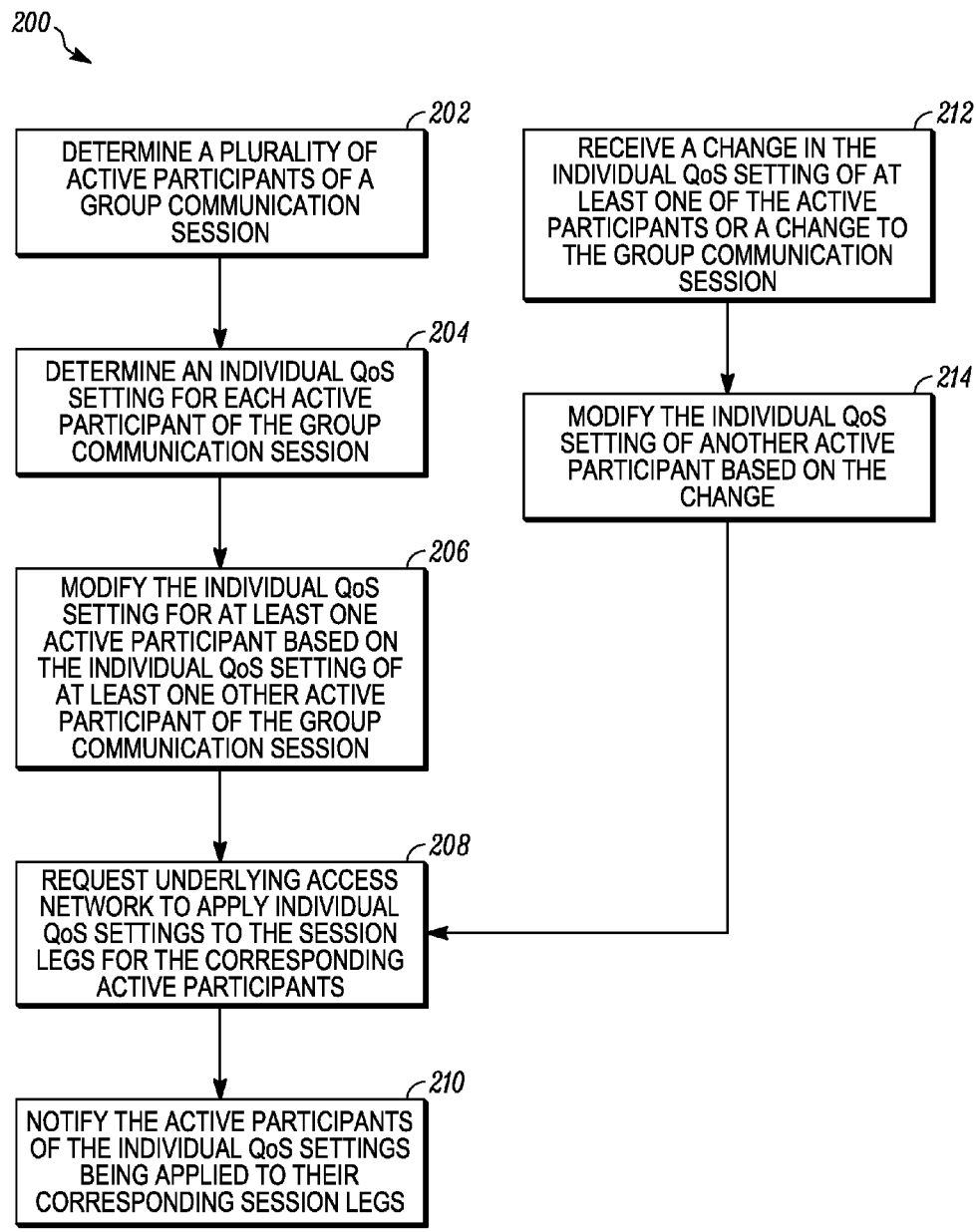
FIG. 2 is a logical flowchart illustrating a method for managing QoS settings for group communications in accordance with some embodiments.
Figure 3:
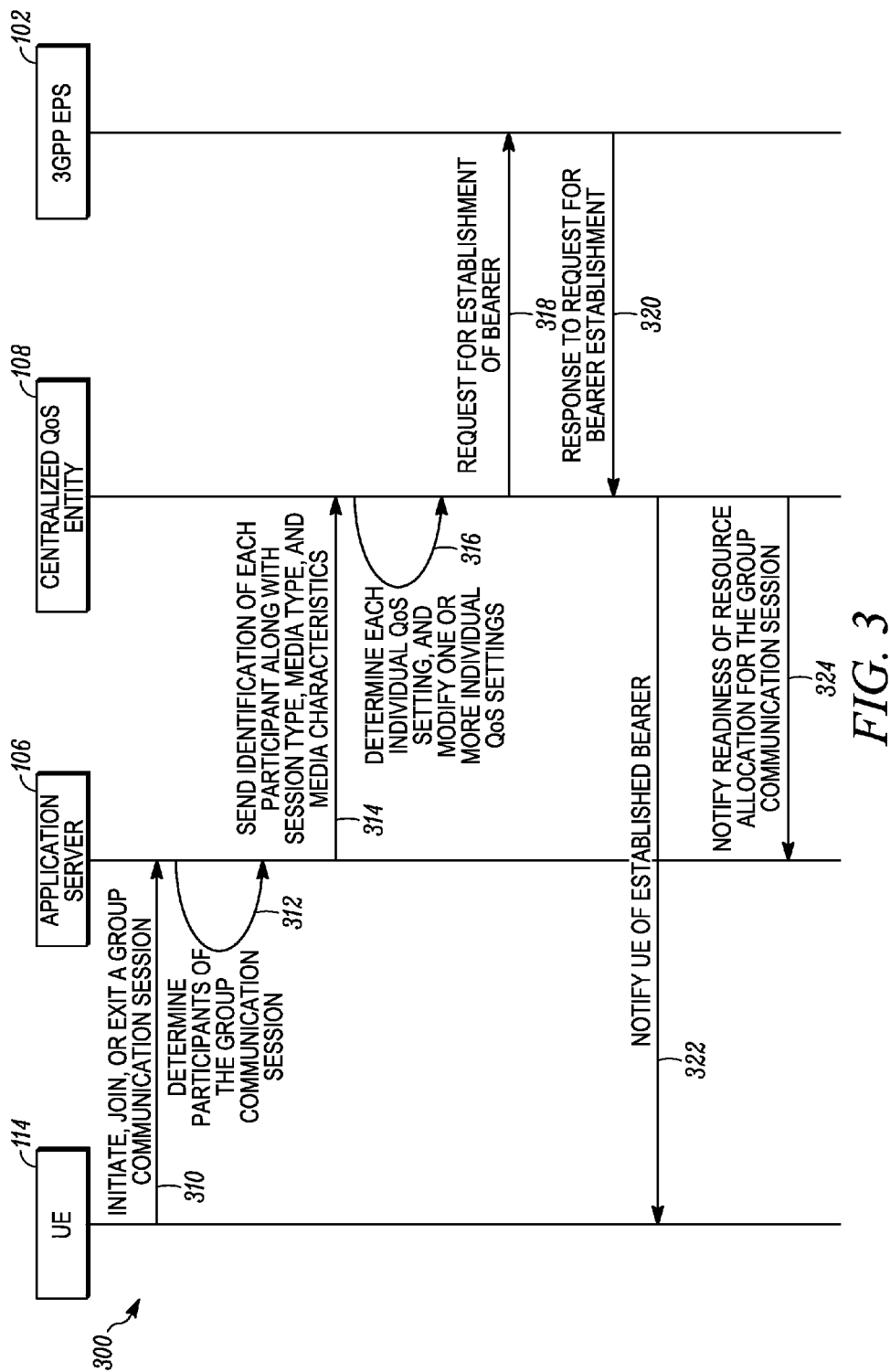
FIG. 3 is a message sequence diagram illustrating a method for managing QoS settings for group communications in accordance with some embodiments.
Figure 4:
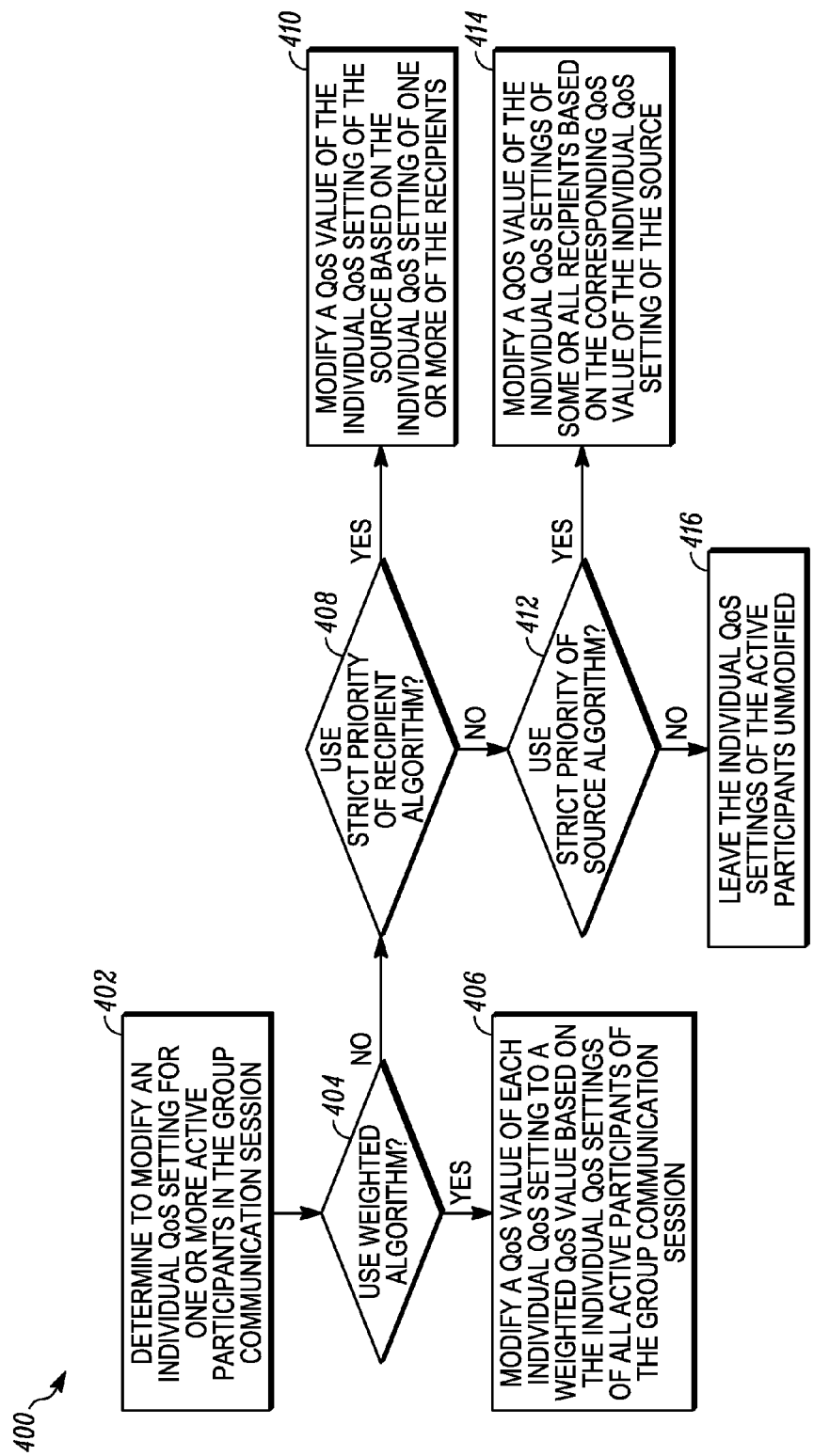
FIG. 4 is a logical flowchart illustrating a method for managing QoS settings using an example QoS setting modification algorithm in accordance with some embodiments.

In general, as used herein, the UEs 114 and 116 and infrastructure devices, such as the application server 106, the centralized QoS entity 108, components of the 3GPP EPC 104, the eNodeB 110, and the eNodeB 112 or their hardware being "configured" or "adapted" means that such elements are implemented using one or more (although not shown) memory devices, network interfaces, and/or processing devices that are operatively coupled, and which, when programmed, form the means for these system elements to implement their desired functionality, for example, as illustrated by reference to the methods shown in FIGS. 2-4. The network interfaces are used for passing signaling also referred to herein as messaging (e.g. messages, packets, datagrams, frames, superframes, and the like) containing control information, voice or non-voice media between the elements of the system 100. The implementation of the network interface in any particular element depends on the particular type of network, i.e. wired and/or wireless, to which the element is connected. For example, the UEs contain wireless interfaces to wirelessly attach to the RAN, and there may be wired interfaces between the infrastructure devices contained in the 3GPP EPS 102 and the application server 106 and centralized QoS entity 108.

Where the network supports wireless communications, the network interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware. Examples of wired interfaces include Ethernet, T1, USB interfaces, etc.

The processing devices utilized by the elements of system 100 may be partially implemented in hardware and, thereby, programmed with software or firmware logic or code for performing functionality described by reference to FIGS. 2-4; and/or the processing devices may be completely implemented in hardware, for example, as a state machine or ASIC (application specific integrated circuit). The memory implemented by these system elements can include short-term and/or long-term storage of various information needed for the functioning of the respective elements. The memory may further store software or firmware for programming the processing device with the logic or code needed to perform its functionality.

We now turn to a detailed description of the functionality of the system 100 elements in accordance with the teachings herein and by reference to the remaining figures. FIG. 2 illustrates a logical flow diagram showing a general method 200 performed by a centralized QoS entity, e.g. the entity 108, for managing QoS settings for group communications. Any numbers of events can trigger the centralized QoS entity to perform the method 200, including, an initiation or start of a group communication session, a modification to the group communication session, such as a change in a source of media or an active participant joining or leaving an existing group communication session, or a change in an individual QoS setting for one of the active participants of an existing group communication session.

A group communication session is defined as a series of interactions or communications between a plurality of endpoints, such as UE, wherein the interactions are associated with an identifiable group (e.g. via a group identifier (ID), a group name, or a list of group participants) and occur between a time that the session is initiated and a time that the session is terminated. Session initiation, termination, and any modifications to the session are affected using signaling defined by any suitable proprietary or standard session management protocol such as Session Initiation Protocol (SIP) as defined in Internet Engineering Task Force Request for Comments 3261 dated June 2002, used in 3GPP communication systems. The particular session management protocol depends on the system design requirements and preferences.

A group communication session can be initiated, terminated or modified by a UE or a network infrastructure device (such as one in an enterprise network). However, in this illustrative implementation, the session signaling is sent through the application server, e.g. the element 106, for session management. Session management includes, for instance, maintaining for each session one or more of: a group ID, an identification (e.g. a user and/or device ID, an IP address, etc.) of the active participants, status of the session, characteristics of the session (e.g. session type, media type and characteristics, etc.), participant device characteristics, individual QoS setting for each active participant, etc.

A UE "joins" and its communications, thereby, become associated with a given group communication session by exchanging the necessary signaling (e.g. SIP signaling) defined by the applicable session management protocol. Upon successfully joining the session, the UE (and its user) becomes an "active participant" of the session. Moreover, a successful exchange of such signaling to join the UE to the session, thereby, creates a "session leg" for use by that UE. Similarly, the UE exchanges the required session management protocol signaling (e.g. SIP signaling) to exit or leave the group communication session, thereby, tearing down the session leg used by the UE, which results in the UE no longer being an active participant. Accordingly, by one or more UEs exchanging the requisite session control signaling, session legs can be created to exchange media using one or more one-to-one (i.e. unicast) bearers or one or more one-to-many bearers, e.g. Multimedia Broadcast Multicast Services (MBMS) bearers.

Upon occurrence of one of the triggering events for a group communication session (e.g. a change in the group communication session or a change in the individual QoS setting for one of the active participants), the centralized QoS entity determines, at 202, a plurality of active participants of the group communication session. For example, the centralized QoS entity receives the identification of all the active participants of the group communication session from the application server 106. The identification of each active participant can comprise a user ID, such as an international mobile subscriber identity (IMSI), and/or a device ID, such as an international mobile equipment identifier (IMEI). Alternatively, the centralized QoS entity receives a group communication session identifier (session ID) or group ID from the application server. The centralized QoS entity then uses the session ID or group ID to retrieve the identification of all the active participants of the group communication session from an internal or external database or from an infrastructure device in the underlying wireless network.

At 204, the centralized QoS entity determines an individual QoS setting for each active participant of the group communication session, wherein the individual QoS setting for the active participant is to be applied to a session leg established for use by the active participant for media transmissions. As stated above, the session leg can be established for unicast bearers, or the session leg can be established for MBMS bearers. In the latter case of a session leg utilizing MBMS bearers, multiple UEs would in essence share the same session leg and would, thereby, have the same individual QoS setting for that session leg. An individual QoS setting, for a given UE or user, is defined as comprising a set of QoS parameter values that are determined without consideration of the UE's or the user's status as an active participant within a group communication session, wherein the individual QoS setting is to be applied to a session leg established for use by the UE for media transmissions. Accordingly, the individual QoS setting is applied to all bearers established for the session leg used by that UE for media transmissions, including both unicast and MBMS bearers.

The particular QoS parameter values within the set depend on the QoS parameters defined by the particular QoS framework used in the communication system. The individual QoS settings can be determined based on a variety of factors. For example, each value of an individual QoS setting may be determined based on a corresponding role associated with the active participant (such as police chief or patrolman), purpose of the group communication session (such as a type of incident related to the group communication session), jurisdictional coverage area of the active participants, type of the application used by the group communication session, etc. To "determine" an individual QoS setting for each active participant, the centralized QoS entity may receive or retrieve the individual QoS settings from other infrastructure devices, such as the application server 106, a home subscriber server (HSS) residing in the 3GPP EPC 104, an authentication, authorization, and accounting (AAA) server (not shown), and databases (not shown) of FIG. 1 or may receive or retrieve QoS policy rules or other data from one or more of these entities to derive the individual QoS settings.

At 206, the centralized QoS entity modifies the individual QoS setting for at least one active participant based on the individual QoS setting for at least one other active participant of the group communication session. The centralized QoS entity can use any suitable algorithm (also referred to herein as a QoS setting modification algorithm) that considers the values of one or more QoS parameters comprised within the individual QoS setting for some or all of the active participants to modify at least one of the QoS parameter values within the individual QoS settings of one or more of the other active participants of an ongoing group communication session. One example algorithm used in a 3GPP communication system architecture is described by reference to FIG. 4. However, the present disclosure is not limited by the particular algorithm used to modify the individual QoS settings in accordance with the teachings herein.

The centralized QoS entity, at 208, then requests the underlying wireless network (e.g. the 3GPP EPS 102) to apply the one or more individual QoS settings (e.g. those that were modified at functional block 206 and in some instances (for example at session initiation) one or more other individual QoS settings that were not modified) to the session legs for the corresponding active participants. In other words, the modified QoS setting is applied to one or more unicast or MBMS bearers requested for or assigned for use by the active participant, whereby, packet resource allocation and/or packet forwarding treatment associated with the session leg for that active participant is affected by the QoS parameter values contained in the modified individual QoS setting. As used herein, a bearer is defined as an information path of defined capacity, delay and bit error rate. In a 3GPP system, the individual QoS setting is applied to a bearer extending from the UE to the PCEF. For instance, the centralized QoS entity sends to the underlying wireless network one or more requests (using any suitable standardized or proprietary signaling, for instance) to activate or modify the required bearers for the session legs and includes in the request(s) the applicable QoS parameters that are to be applied to each requested bearer.

At 210, the centralized QoS entity notifies the active participants of the individual QoS settings being applied to their corresponding session legs. Again, any suitable standardized or proprietary signaling can be used for this purpose. At 212, while the group communication session is ongoing, the centralized QoS entity may receive an indication of a change that causes it to recalculate the individual QoS settings for one or more active participants. For instance, the change may be a change in the individual QoS setting for at least one of the active participants, received for instance from the application server 106 or some other infrastructure device within the system 100. An individual QoS setting is changed when one or more of its QoS parameter values have changed and may be based on any number of factors including, but not limited to, a user role changing or the declaration of an emergency, for instance. In another example implementation, the change is a change in the group communication session. This indication of a change to the session is received, for instance, via signaling from the application server 106, wherein the centralized QoS entity determines from the signaling that an active participant has joined or left the ongoing group communication session.

A change in the group communication session also occurs when there is a change in a source of media (also referred to herein as a "source change") among the active participants of the session, such as when a camera 1 is an initial source of video media and then a camera 2 becomes a new source of video media within the session. A source is defined as an active participant who uploads or sends data, such as video or voice data, while recipients are active participants who download or receive the uploaded (sent) data. The uploaded and the downloaded flows are also referred to herein, respectively, as inbound and outbound flows. A source change happens when the current source of media ceases the current inbound flow and another active participant commences a new inbound flow. Such a source change serves as a trigger to modify an individual QoS setting for one or more active participants of the group communication session.

At 214, the change in the group communication session or in the individual QoS setting for an active participant triggers the centralized QoS entity to use the QoS setting modification algorithm to determine, re-compute or recalculate individual QoS settings for the current set of active participants of the session. More particularly, using the given algorithm (e.g. the algorithm used in functional block 206), the centralized QoS entity modifies the individual QoS setting for one or more active participants based on the change detected in block 212.

Referring now to FIG. 3, illustrated is a message sequence diagram showing an example method 300 performed within a communication system, such as the 3GPP communication system 100 of FIG. 1, for managing QoS settings for group communications. Accordingly, FIG. 3 illustratively shows signaling and further functionality performed by and between the UE 114, the application server 106, the centralized QoS entity 108, and the 3GPP EPS 102 in accordance with the present teachings.

Turning now to the method 300, the UE 114 initiates a group communication session or affects a change to an existing communication session by sending the appropriate signaling 310 to the application server 106. A change to the communication session can include the UE joining or leaving an ongoing communication session, for instance. In this illustrative implementation, signaling 310 has a standard SIP signaling format, e.g. a SIP INVITE to initiate or join a session, a SIP UPDATE to modify a session, or a SIP BYE to leave a session, and the signaling 310 is sent via the LTE EPS and SIP core to the application server 106. In an embodiment, the signaling 310 contains an identifier associated with the group communication session, such as a group ID, a list of user IDs, or a list of IP addresses for the group communication session.

Responsive to the signaling 310, the application server 106 determines at 312, e.g. from the group ID, the list of user IDs or IP addresses, the identification of the active participants of the group communication session. For example, the application server 106 determines the user ID and/or the device ID of each active participant. In this example implementation, the application server 106 also determines additional information related to the group communication session, which is useful for determining individual QoS settings for the active participants. For instance, based on the signaling 310, the application server 106 determines the session type, media type for media that will be communicated during the session, a source of the media, recipients of the media, media characteristics, device characteristics or capabilities, etc. The application server 106 sends this information related to the group communication session and the identification for each active participant to the centralized QoS entity 108 within signaling 314, which can take on any suitable format either standard or proprietary.

With further regards to the information related to the group communication session mentioned in the previous paragraph, the session type describes the purpose of the group communication session. For example, the session type specifies that the group communication session is a weekly status meeting for a department, or a conference call for handling a 911 call situation, etc. Media type specifies the type of media, such as video or voice, of the group communication session. The media characteristics describe the media. For example, the bit rate of a video stream is a video characteristic. The device characteristics or capabilities include, for instance but are not limited to, voice only, codec type or rate, etc.

Alternatively, the application server 106 sends a group communication session ID and the information related to the session (e.g. media type, session type, media source, media recipients) to the centralized QoS entity 108 within messaging 314. The centralized QoS entity 108 then uses this information and determines the identification, such as a user ID or device ID, of each active participant using the session ID. For example, using the session ID, the centralized QoS entity 108 retrieves the identification of each active participant of the corresponding group communication session from a database or an infrastructure device within the system 100.

At 316 and using the information obtained from the application server 106, the centralized QoS entity 108 determines an individual QoS setting for each active participant of the group communication session. The centralized QoS entity 108 further, at 316, applies a QoS setting modification algorithm to modify the individual QoS setting for at least one of the active participants based on the QoS setting for one or more of the other active participants. In this way, the QoS settings for each leg of the communication session is advantageously determined in light of the QoS settings for all active participants instead of the QoS setting for each leg being determined independently and individually, as in the prior art. This enables a balancing of priorities between the source and recipient(s) of media to facilitate the appropriate QoS treatment for active participants to facilitate an acceptable end-to-end QoS for the entire communication.

In a 3GPP implementation, for example, the algorithm could take into consideration any of the service level QoS parameters, i.e. ARP, QCI, GBR, and MBR. However, disclosed herein by reference to FIG. 4 is an illustrative algorithm that modifies the ARP and/or QCI values within the individual QoS setting for a given active participant taking into consideration the ARP and/or QCI values within the individual QoS setting for one or more other active participants of a particular group communication session. Generally, the overall QoS setting modification algorithm of FIG. 4 can use a weighted algorithm to change the QCI and/or ARP value of the QoS setting for an active participant to a weighted QCI and/or ARP value that is derived from the individual QoS settings of all of the active participants. The overall QoS setting modification algorithm of FIG. 4 can alternatively use a strict priority of recipient algorithm or a strict priority of source algorithm to change the QCI and/or ARP value of the QoS setting for an active participant to a highest QCI and/or highest ARP that is determined from the individual QoS settings of the remaining active participants.

As used herein, a Highest QCI means a QCI value that corresponds to the highest level of preferential treatment among the QCI values being considered. In accordance with the current 3GPP standards, the Highest QCI corresponds to a QCI (index) value of 5 being considered, which in turn maps to a highest priority level of 1. In an alternative implementation, the Highest QCI could correspond to the smallest QCI (index) value of 1 or the largest QCI (index) value of 9 being considered. As further used herein, a Highest ARP means an ARP value that corresponds to the highest level of preferential treatment among the ARP values and/or ARP flags being considered. In accordance with the current 3GPP standards, the Highest ARP corresponds to the smallest ARP value being considered, although in an alternative implementation, the Highest ARP could correspond to the largest ARP value being considered.

The QCI value is a meaningful QoS parameter to consider within the algorithm because it is a scalar value that controls packet forwarding treatment on a bearer for an active participant in terms of: resource type (GBR or Non-GBR); priority; packet delay budget; and packet error loss rate. For example, under the standardized 3GPP QoS framework, a bearer with a QCI value of 5 receives the highest QCI priority (i.e. most preferential treatment for this particular QoS parameter) for packet forwarding treatments (such as scheduling and queue management) from the underlying wireless network. To the contrary, a bearer with a QCI value of 9 receives the lowest QCI priority (i.e. least preferential treatment for this particular QoS parameter) for packet forwarding treatments.

The ARP value is a meaningful QoS parameter to consider within the algorithm because it controls whether a bearer establishment or modification should be performed due to radio access network resource limitations (such as bandwidth). More particularly, the ARP QoS parameter contains information about the priority level, the pre-emption capability, and the pre-emption vulnerability. The priority level defines the relative importance of a resource request. This allows deciding whether a bearer establishment or modification request can be accepted or needs to be rejected in case of resource limitations (typically used for admission control of GBR traffic). It can also be used to decide which existing bearers to pre-empt during resource limitations. Under the standardized 3GPP QoS framework, a larger ARP value corresponds to a lower ARP priority (i.e. lesser preferential treatment for this particular QoS parameter), and a smaller ARP value corresponds a higher ARP priority (i.e. greater preferential treatment for this particular QoS parameter). The pre-emption capability information defines whether a service data flow can get resources that were already assigned to another service data flow with a lower priority level; and the pre-emption vulnerability information defines whether a service data flow can lose the resources assigned to it in order to admit a service data flow with a higher priority level.

Upon determining the individual QoS settings for each participant, the centralized QoS entity 108 sends signaling 318 to the 3GPP EPS 102 to request the requisite number of bearers needed for the session, wherein the signaling 318 includes the corresponding individual QoS settings including those modified at 316. In this illustrative implementation, the signaling 318 is in compliance with the Rx interface as standardized in the 3GPP TSs, for example in 3GPP TS 23.203 and TS 29.214. One request message could be sent for each bearer requested or a single request message could be sent requesting multiple bearers. The number of bearers requested depends on the circumstances. For example, at session initiation, bearers may be requested for all active participants. However, during an ongoing session, for each active participant with its individual QoS setting modified at 316, the centralized QoS entity 108 can request the 3GPP EPS 102 to apply the modified individual QoS setting to a bearer already established for use by the active participant. Alternatively, the centralized QoS entity 108 requests a new bearer. In any event, the 3GPP network 102 at least modifies one or more existing bearers or establishes one or more new bearers for the active participant with the modified individual QoS setting.

Using signaling 320, the 3GPP EPS 102 sends a response to the centralized QoS entity 108 confirming successful establishment and/or modification of the bearer between the active participant and the 3GPP EPS 102. In this illustrative implementation, the signaling 320 is in compliance with the Rx interface as standardized in the 3GPP TSs, for example, in 3GPP TS 23.203 and TS 29.214. Reactive to this response and using signaling 322, the centralized QoS entity 108 notifies the active participant of the modified and/or established bearer and associated modified individual QoS settings that were applied to the bearers established between the active participant and the 3GPP EPS 102. In this illustrative implementation, the signaling 322 is a SIP message, such as, a SIP NOTIFY message. Moreover, using signaling 324 (which can be any suitable standard or proprietary message), the centralized QoS entity 108 notifies the application server 106 that individual QoS settings for the group communication session have been successfully configured and that resources have been successfully allocated.

Referring now to FIG. 4, a logical flow diagram of an illustrative QoS setting modification algorithm 400 performed by a centralized QoS entity within a 3GPP system is shown. As stated above, the algorithm uses QCI and ARP values to modify one or more individual QoS settings. In general, and using various sub-algorithms, the individual QoS setting for an inbound media flow from the source of the media and the QoS setting for the outbound media flow to one or more recipients of the media are set to have a matching value in order to facilitate more appropriate QoS treatment for all of the participants of a group communication session. The details of this example QoS setting modification algorithm are next described.

At 402, the centralized QoS entity determines to modify a QoS setting for one or more active participants of a group communications session. In performing the QoS setting modification algorithm of FIG. 4, the centralized QoS entity requires knowledge of a status of each participant as a source or recipient of media to be sent during the session at that given time. This status information can be obtained, for instance, from the application server 106.

At 404, the centralized QoS entity determines whether a weighted algorithm should be used for modifying the individual QoS settings. In one embodiment, the use of the weighted algorithm is determined based on whether the number of active participants exceeds a pre-established threshold number of active participants. If a weighted algorithm should be used, the centralized QoS entity, at 406, derives a weighted QCI and/or ARP value from the QCI and ARP values of the individual QoS settings of all of the active participants. The weighted ARP and/or QCI value is then applied to the source and all recipients of the media. In this manner, the same (i.e. a matching) weighted QoS parameter value is applied to the inbound media flow from the source and to all of the outbound media flows to the recipients.

In one illustrative embodiment of the present teachings, the centralized QoS entity computes, at 406, a weighted ARP or QCI value from the corresponding QCI values and ARP values of the individual QoS settings of all the active participants of the group communication session. Example equations for computing a weighted ARP value and a weighted QCI value that are applied to all of the active participants are as follows:

$$\text{ARP\_weighted} = a_0 \cdot \text{ARPsource} + \Sigma a_k \cdot \text{ARPrecipient}_k,$$

wherein ARP_weighted is the computed weighted ARP, $a_0$ is the weight for the source, ARPsource is the ARP value of the source, $k$ is an index for the recipients, $a_k$ is the weight for the $k$-th recipient, and ARPrecipient$_k$ is the ARP value of the $k$-th recipient. As used herein, $k$ stands for an integer, such as 1, 5, 8, and the like.

$$\text{QCI\_weighted} = q_0 \cdot \text{QCIsource} + \Sigma q_k \cdot \text{QCIrecipient}_k,$$

wherein QCI_weighted is the computed weighted QCI, $q_0$ is the weight for the source, QCIsource is the QCI value of the source, $k$ is an index for the recipients, $q_k$ is the weight for the $k$-th recipient, and QCIrecipient$_k$ is the QCI value of the $k$-th recipient.

The weight (a and q) for each active participant depends on one or more factors. For example, a source is assigned a larger or smaller weight than are the recipients. The centralized QoS entity can determine the weights by retrieving them from a database or an application server. Moreover, the weighted QoS value is rounded down or up to an integer value when it is not an integer value.

In addition, depending on the circumstances, a computed weighted QoS value may not be usable as an individual QoS parameter value. For such cases, the weighted algorithm is designed to further modify the computed weighted value so that it is applicable within the given context. For example, the media transmitted during the session may be video, but the computed weighted QCI value may correspond to a value reserved by the QoS mechanism for voice transmissions. In that case, the weighted algorithm would further modify the computed weighted QCI value to one that can be used for video transmission.

Turning back to 404, if a weighted algorithm should not be used, the centralized QoS entity determines, at 408, whether a strict priority of recipient algorithm should be used for modifying the individual QoS settings. An example of when to use a strict priority of recipient algorithm is when one of the recipients (e.g. a chief of police) has a highest priority level (of all of the active participants) that needs to be satisfied during a group communication session. If a strict priority of recipient algorithm should be used, at 410, the centralized QoS entity determines the Highest QCI and/or the Highest ARP among the individual QoS settings of all the recipients. The computed Highest QCI and ARP are applied to the source of the media. In this manner, the individual QoS setting for the source (as applied to the inbound media) is set to match the QoS setting for the recipient having a QoS setting that corresponds to the highest or most preferential QoS treatment.

Example equations for computing the Highest ARP and the Highest QCI are as follows:

Highest ARP=Min(ARPrecipient_1, . . . , ARPrecipient_n), which represents the smallest value of all the ARP values for the recipients, wherein Highest ARP is applied to the session leg for the source only when the ARP value for the source is not the smallest ARP value of all of the active participants.

Highest QCI=Max(QCIrecipient_1, . . . , QCIrecipient_n), which represents the QCI that corresponds to the highest QCI priority of all the recipients;
wherein the Highest QCI is applied to the session leg for the source only when the QCI value for the source does not correspond to the Highest QCI priority of all of the active participants.

Turning back to 408, if a strict priority of recipient algorithm should not be used, the centralized QoS entity determines, at 412, whether a strict priority of source algorithm should be used for modifying the individual QoS settings. This algorithm might be applied, for instance, when the source is streaming a high quality video and it is important that some or all of the recipients receive the high quality video. If a strict priority of source algorithm should be used, at 414, the centralized QoS entity determines that the source has the Highest QCI and/or the Highest ARP among the individual QoS settings of all the active participants. The computed Highest QCI and ARP of the source are then applied to some or all of the recipients of the media. For example, when the bandwidth of the underlying wireless network is limited, or the number of the recipients is over a predetermined threshold, the computed Highest QCI and ARP may only be applied to recipients playing important roles in the group communication session. In this manner, the individual QoS setting for one or more of the recipients (as applied to the outbound media) is set to match the QoS setting for the source (as applied to the inbound media).

Example equations for computing the Highest ARP and the Highest QCI are as follows:

Highest ARP=ARPsource, if ARPsource<Min(ARPrecipient_1, . . . , ARPrecipient_n), wherein the Highest ARP is valid only when the ARPsource is smaller than Min(ARPrecipient_1, . . . , ARPrecipient_n), and Min(ARPrecipient_1, . . . , ARPrecipient_n) is the smallest value of all the ARP values of the recipients.

Highest QCI=QCIsource, if QCIsource>Max(QCIrecipient_1, . . . , QCIrecipient_n), wherein the Highest QCI is valid only when the QCIsource corresponds to a higher QCI priority than Max(QCIrecipient_1, . . . , QCIrecipient_n), wherein Max(QCIrecipient_1, . . . , QCIrecipient_n) is the QCI value that corresponds to the highest QCI priority of recipients 1 through n.

Turning back to 412, if a strict priority of source algorithm should not be used, the centralized QoS entity, at 416, leaves the individual QoS settings of the active participants of the group communication session unmodified. Alternatively, the centralized QoS entity may, at 416, apply other suitable QoS setting modification algorithms to modify the individual QoS settings.

The following example further highlights illustrative advantages of using the present teachings. In this example, a state police chief and a county police patrolman are active participants of a real-time video conference. In the prior art, the individual QoS settings for the police chief and the patrolman are determined independently and separately as follows:

$ARP_{police\ chief}=3$, wherein $ARP_{police\ chief}$ is the ARP value for the police chief and 3 is an assigned ARP value to the police chief;

$QCI_{police\ chief}=4$, wherein $QCI_{police\ chief}$ is the QCI value for the police chief and 4 is an assigned QCI value to the police chief for video conference purposes;

$ARP_{patrolman}=10$, wherein $ARP_{patrolman}$ is the ARP value for the patrolman and 10 is an assigned ARP value to the patrolman;

$QCI_{patrolman}=7$, wherein $QCI_{patrolman}$ is the QCI value for the patrolman and 7 is an assigned QCI value to the patrolman for video conference purposes.

However, for the same active participants of the same video conferencing session, the individual QoS settings for the police chief and the patrolman are jointly determined under the present teachings as follows:

Highest ARP=Min($ARP_{police\ chief}$, $ARP_{patrolman}$)=3
Highest QCI=Max($QCI_{police\ chief}$, $QCI_{patrolman}$)=4
$ARP_{police\ chief}$=Highest ARP=3
$QCI_{police\ chief}$=Highest QCI=4
$ARP_{patrolman}$=Highest ARP=3
$QCI_{patrolman}$=Highest QCI=4

Application of the present teachings decreases the patrolman's ARP value from 10 to 3 and increases the patrolman's QCI value from 7 to 4. Accordingly, the patrolman's ARP priority and QCI priority are increased, for this real-time video conference, in view of the individual QoS setting for the police chief. The increased QoS priorities for the patrolman provide for appropriate QoS treatment by the underlying wireless network for both the police chief and the patrolman during the video conference session.

Figure 5:
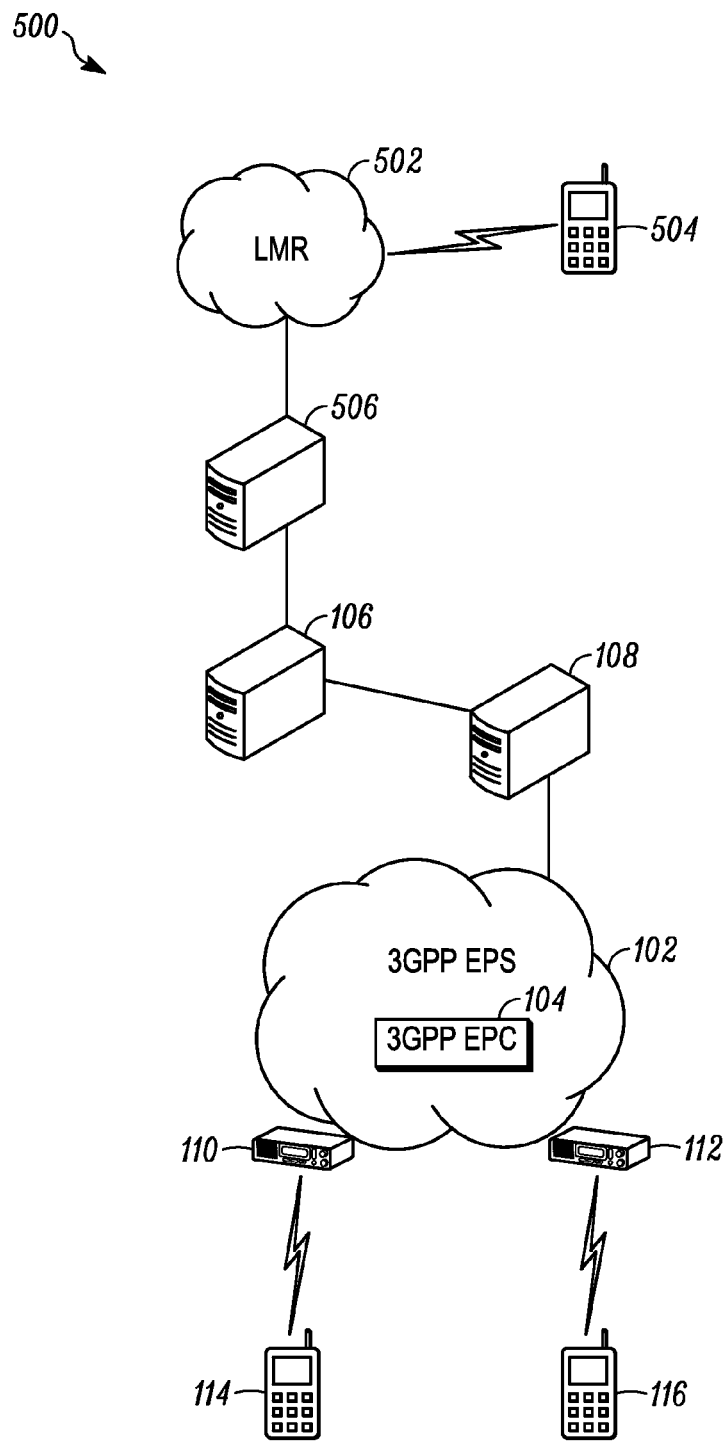
FIG. 5 illustrates a communication system implementing embodiments of the present teachings across heterogeneous networks.

Referring now to FIG. 5, an illustrative communication system implementing alternate embodiments in accordance with the present teachings is shown and indicated generally at 500. System 500 comprises and expands upon system 100 shown in FIG. 1. Accordingly, in addition to the elements 102 to 116 of system 100, system 500 further includes a Land Mobile Radio (LMR) network 502, a LMR radio (also referred to herein as LMR UE) 504, and a LMR gateway 506. Only a limited number of system elements 502 to 506 are shown for ease of illustration; but additional such elements may be included in the communication system 500. Moreover, other components needed for a commercial embodiment of the system 500 are omitted from the drawing for clarity in describing the enclosed embodiments. Furthermore, in this illustrative implementation, the LMR network 502 is an Association of Public-Safety Communications Officials International Project 25 (APCO-25) communication network meaning that the system elements 502-506 are configured to operate in compliance with one or more aspects of the APCO-25 standard specifications. However, the teachings herein are applicable to any communication system having a wireless network that provides for a QoS mechanism that is adaptable for group communications. For example, the present teachings are equally applicable when the network 502 is a LMR Conventional network, or a Terrestrial Trunked Radio (TETRA) communication network, for instance. The LMR network 502 provides talk group, group call, and PTT capabilities, among others, to LMR UEs. A LMR UE is a UE that operates on a LMR network. The LMR UE 504 attaches to and operates on the LMR network 502 through a base station (not shown) within the LMR network 502.

The LMR gateway 506 bridges the communications, such as, a PTT group communication session involving the LMR UE 504 and the UE 114, between the LMR network 502 and the 3GPP EPS 102, which are two different types of networks also referred to herein as "heterogeneous" networks. As used herein, heterogeneous networks are defined as wireless networks that use different QoS frameworks. As shown, the LMR gateway 506 communicates with the application server 106 to provide interoperability between the LMR network 502 and the 3GPP EPS 102. Alternatively, the LMR gateway 506 communicates with the application server 106 indirectly through another server (not shown). In one particular embodiment, the LMR gateway 506 utilizes a standard APCO-25 Inter-RF Subsystem Interface (ISSI) to communicate with the application server 106. In other embodiments, the LMR gateway 506 communicates with the application server 106 using an Open Mobile Alliance push-to-talk over cellular (OMA PoC) protocol, a TETRA ISI protocol, a Radio Over IP (RoIP) protocol, or a push-to-talk (PTT) network-to-network protocol, to name a few.

For group communications over the LMR network 502, the LMR network is capable of assigning different group priorities to different communication groups. For example, a public safety agency operated LMR network may assign a higher group priority to a communication group formed to handle a fatal traffic accident, and a lower group priority to a communication group formed to smooth a traffic jam. "Priority" and "group priority" are general terms used, herein, to refer to a means for QoS differentiation based upon the corresponding QoS framework of certain wireless networks. In LMR networks, for example, group priorities are represented by a set of integers, such as integers 0 through 7. A group priority affects, for example, network bandwidth allocation and voice and data traffic routing by the underlying LMR network. All participants of a communication group over a LMR network share the same assigned group priority. In other words, the LMR network considers all participants of the communication group to have the same priority, i.e. the assigned group priority.

When LMR UEs, such as, the LMR UE 504, of a LMR network participate in a group communication session with UEs, such as the UEs 114-116, attached to the broadband 3GPP EPS 102, the corresponding group of the LMR UEs appears to the application server 106 as a virtual active participant of the group communication session on the 3GPP EPS 102. In other words, the application server 106 considers all the participating LMR UEs as if they are a single active participant attached to the 3GPP EPS 102. In such a case, the virtual active participant is an active participant to the application server 106, and represents a group on the LMR network 502, and the group has an assigned group priority on the LMR network 502.

In determining the highest QCI and ARP for the group communication session, the centralized QoS entity 108 performs a mapping function on the assigned group priority to determine an individual QoS setting for the virtual active participant. For example, the centralized QoS entity 108 maps an assigned group priority of value 6 to an individual QoS setting with a QCI value of 8 and an ARP value of 3. In one particular embodiment of the present teachings, the mapping function is implemented as a lookup table, wherein the table comprises columns of group priority values, QCI values, and ARP values respectively. The highest QCI and ARP for the group communication session are determined based on the individual QoS setting for the virtual active participant and the individual QoS settings for the other active participants attached to the 3GPP EPS 102.

However, the teachings herein are applicable to any communication system having heterogeneous wireless networks that provide for different QoS frameworks, wherein at least one of the wireless networks supports individual priority settings, such as an individual QoS setting within the 3GPP QoS framework. In such a case, a priority mapping function converts a priority setting on one network to an individual priority setting on another network. As in the LMR network case, a group is presented as an active participant in a group communication session on a heterogeneous network, e.g. the 3GPP network; and the group priority is converted to an individual priority setting on the heterogeneous network. However, in other networking scenarios, a UE with an individual priority on one network may be presented as an individual active participant in a group communication session on a heterogeneous network. In such a case, a mapping function would be applied to the individual priority of the UE to convert it to an individual priority setting on the heterogeneous network.

Figure 6:
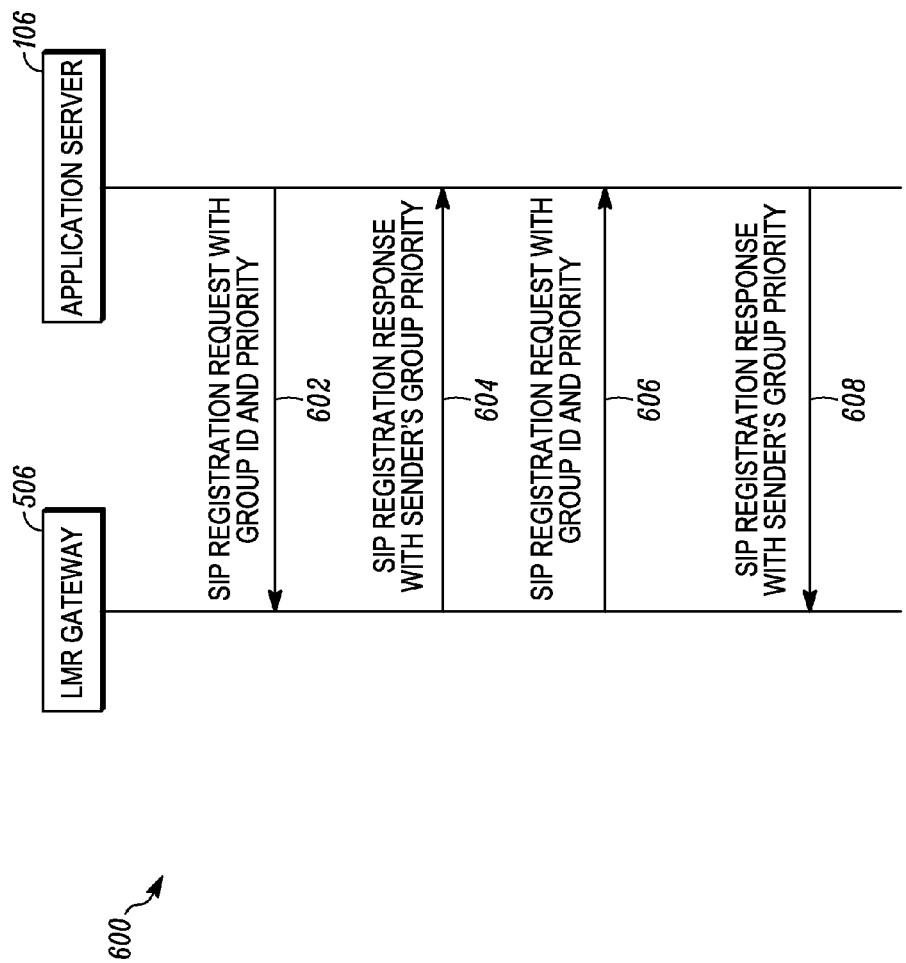
FIG. 6 is a message sequence diagram illustrating a registration method to enable the managing of QoS settings for group communications across heterogeneous networks in accordance with some embodiments.
Figure 7:
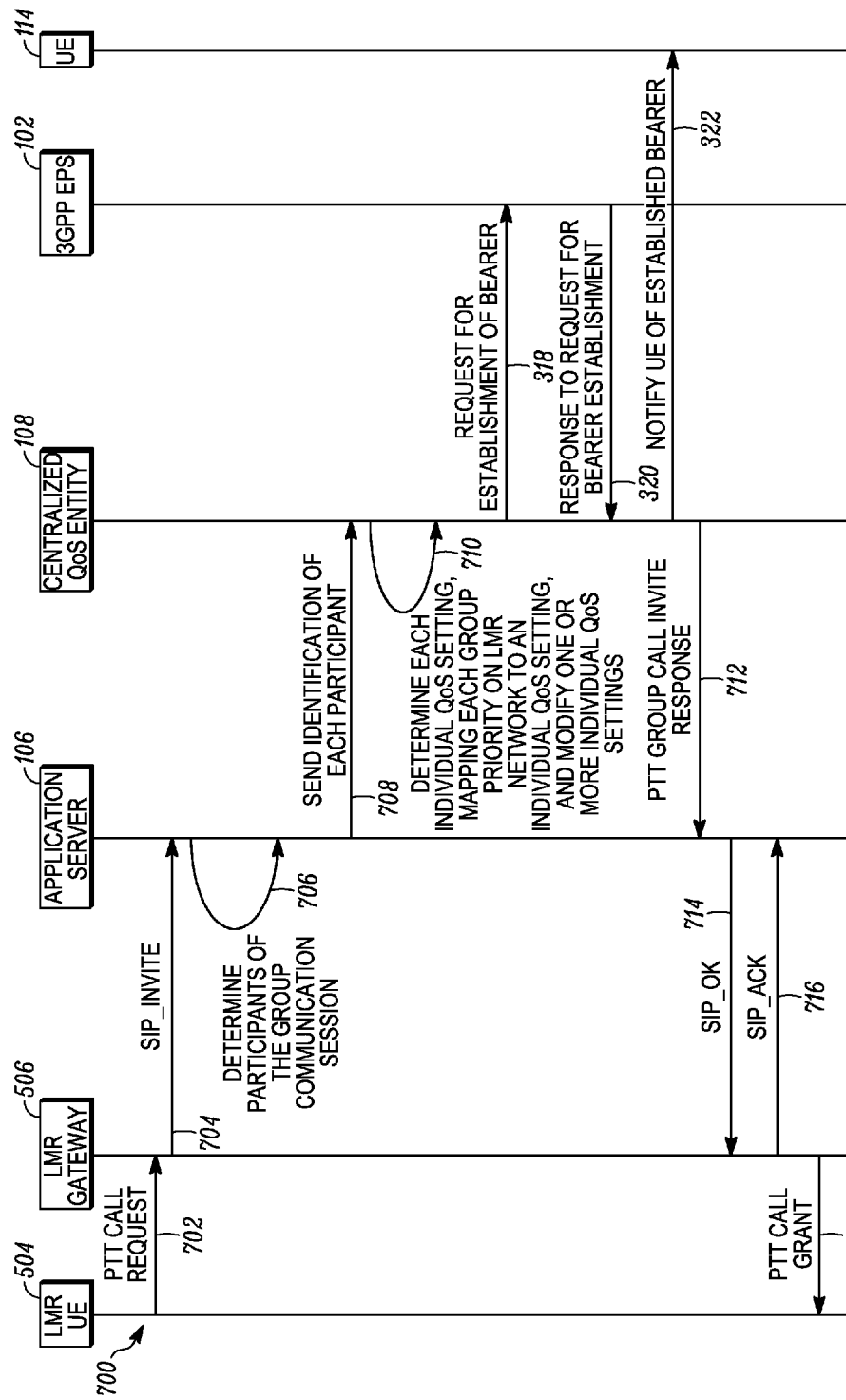
FIG. 7 is a message sequence diagram illustrating a method for managing QoS settings for group communications across heterogeneous networks in accordance with some embodiments.
Figure 8:
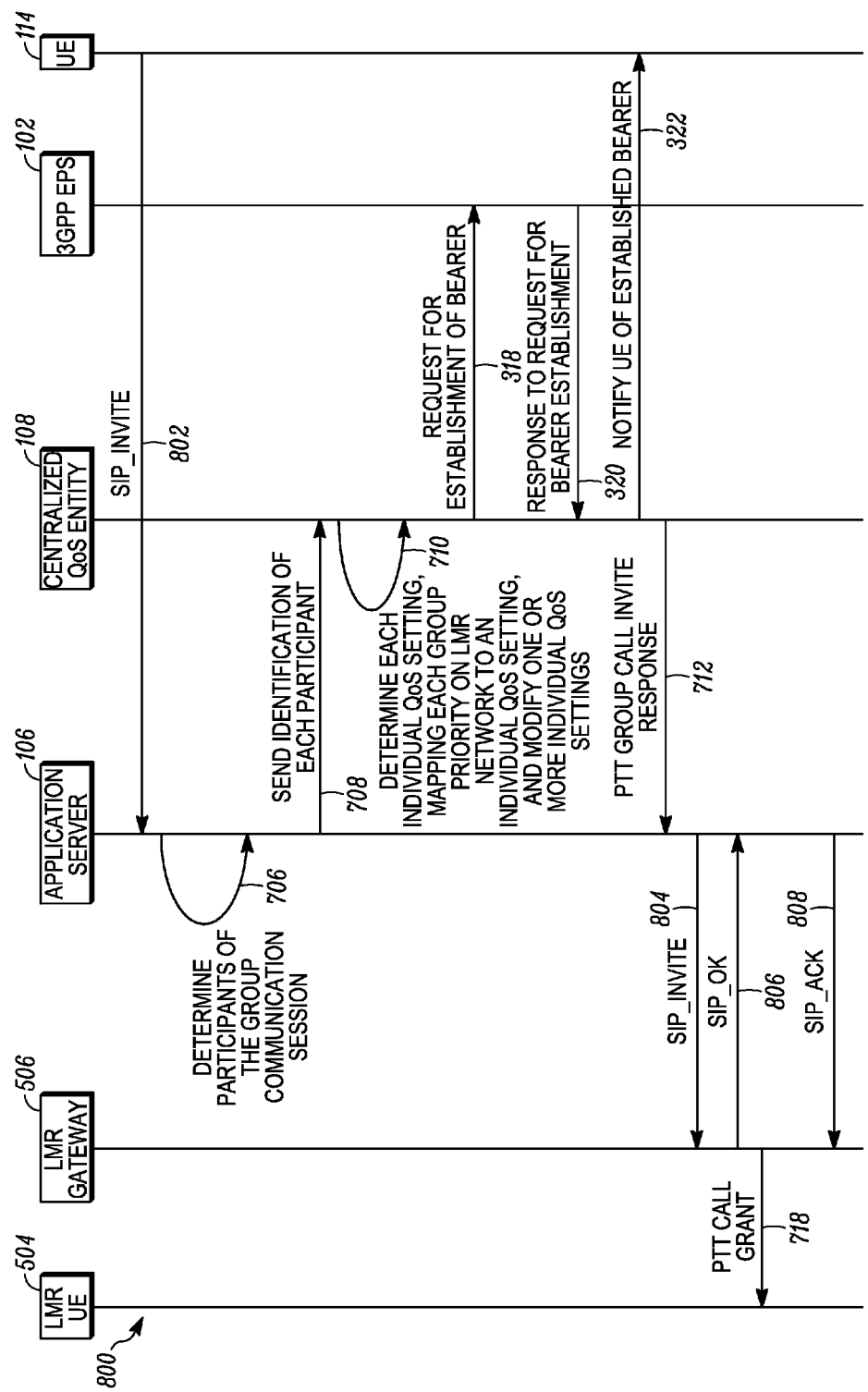
FIG. 8 is a message sequence diagram illustrating a method for managing QoS settings for group communications across heterogeneous networks in accordance with some embodiments.

Each of the FIGS. 6-8 illustrates a message sequence diagram showing an illustrative method performed within a communication system, such as the communication system 500 of FIG. 5, for managing QoS settings for group communications over heterogeneous networks. Accordingly, FIGS. 6-8 illustratively show signaling and further functionality performed by and between the system elements in accordance with the present teachings. Turning now to FIG. 6, the LMR gateway 506 and the application server 106 register with each other using a sequence of messages 600 to enable group communications over the 3GPP EPS 102 and LMR 502 networks. As shown, the registration signaling is performed using SIP protocol. Alternatively, depending upon the wireless networks performing the registration procedure, other proprietary or standard session management protocols could be used.

Turning now to the messaging sequence, at 602, the application server 106 registers a group on the 3GPP wireless network with the LMR gateway 506 by sending a SIP registration request message (signaling) containing a group identifier (group id) and group priority. The group identifier identifies the group to the LMR gateway 506, and the group is, thereby, considered by LMR gateway 506 as a group on the LMR network 502 having the identified group priority. Responsive to the signaling at 602, the LMR gateway 506, at 604, sends a SIP registration response message to the application server 106. The SIP registration response message includes the group priority that was included in the message at 602 for authentication or replay attack purposes.

The LMR gateway 506, at 606, then registers a group with the application server 106 by sending a SIP registration request message containing a group identifier and group priority for a corresponding LMR group. The group identifier identifies a group of LMR UEs, such as, the LMR UE 504, on the LMR network 502. The group priority is mapped, by the centralized QoS entity 108, to an individual QoS setting on the 3GPP network, which is used for determining a highest QCI and a highest ARP for a group communication session. Responsive to the signaling at 606, the application server 106, at 608, sends a SIP registration response message to the LMT gateway 506. The SIP registration response message includes the group priority for the LMR group that was included in the message at 606. In this illustrative implementation, the signaling 602, 604, 606, and 608 comprises a standard SIP signaling format.

Referring now to a sequence of messages 700 shown in FIG. 7, the LMR UE 504 initiates a group communication session involving the UE 114 by sending to the LMR gateway 506 a PTT call request, at 702. Responsive to the request, the LMR gateway 506, at 704, sends a SIP INVITE message to the application server 106. The SIP INVITE message indicates the group communication session initiated by the LMR UE 504, which includes the UE 114. For example, in one particular embodiment, the SIP INVITE includes a group identifier, which is sent to the LMR gateway 506 at 602 of FIG. 6, and that identifies a group on the 3GPP EPS 104 that includes the UE 114. Additionally, the SIP INVITE specifies a group identifier indicating the group on the LMR network 502 that includes the LMR UE 504.

Responsive to the SIP INVITE, the application server 106, at 706, determines the active participants of the group communication session. The active participants include all active participants, including the UE 114, on the 3GPP EPS 102, and the virtual active participant that represents the talk group on the LMR network 502. The talk group on the LMR network 502 includes the LMR UE 504, and has an assigned group priority. The assigned group priority is sent from the LMR gateway 506 to the application server 106 at 606 of FIG. 6. At 708, the application server 106 sends the identification of each active participant of the group communication session to the centralized QoS entity 108 using any standard or proprietary signaling. Additionally, the application server 106 indicates the assigned group priority on the LMR network 502 in the signaling at 708. In illustrative embodiment of the present teachings, the signaling at 708 comprises a PTT group call invite message. Alternatively, the application server 106, at 708, sends a group communication session identifier to the centralized QoS entity 108, and the centralized QoS entity then uses the session identifier to retrieve the identification of all the active participants of the group communication session from an internal or external database or from an infrastructure device in the underlying wireless network.

At 710 and using the information obtained from the application server 106, the centralized QoS entity 108 determines an individual QoS setting for each active participant of the group communication session on the 3GPP EPS 102. For example, the centralized QoS entity 108 retrieves the individual QoS settings from a database (not shown) based on the identification of the active participants. Furthermore, the centralized QoS entity 108, at 710, applies a mapping function to the assigned group priority indicated in the signaling 708 to determine an individual QoS setting for the virtual active participant representing a group on the LMR network 502 that includes the LMR UE 504. The assigned group priority is mapped to a QCI value and an ARP value. The mapping function can be provisioned to the centralized QoS entity 108 in real-time over the communication system 500, or retrieved from a database by the centralized QoS entity 108. Additionally, the centralized QoS entity 108, at 710, applies a QoS setting modification algorithm to modify the individual QoS setting for at least one of the active participants on the 3GPP EPS 102 based on the QoS setting for one or more of the other active participants. For example, the individual QoS setting for the UE 114 is modified based on the individual QoS setting for the virtual active participant. The QoS setting modification is described in the preceding sections.

At 318, the centralized QoS entity 108 requests the 3GPP EPS 102 for the requisite number of bearers needed for the group communication session. Using signaling 320, the 3GPP EPS 102 sends a response to the centralized QoS entity 108 confirming successful establishment and/or modification of the bearer between the active participant (i.e. the UE 114) and the 3GPP EPS 102. Reactive to this response and using signaling 322, the centralized QoS entity 108 notifies the active participant (i.e. the UE 114) of the modified and/or established bearer and associated modified individual QoS settings that were applied to the bearers established between the UE 114 and the 3GPP EPS 102.

At 712, the centralized QoS entity 108 sends the application server 106 a PTT group call invite response message confirming successful initiation of the group communication session. Responsive to the signaling at 712, the application server 106 sends the LMR gateway 506 a SIP OK message, at 714, confirming the SIP invitation (as indicated by the signaling at 704) is successfully processed. The LMR gateway 506 acknowledges this SIP OK message by sending a SIP ACK message to the application server 106, at 716. At 718, the LMR gateway 506 sends a PTT call grant message to the LMR UE 504 to confirm that the PTT call request (sent at 702) was successfully granted.

Turning to a messaging sequence 800 shown in FIG. 8, the UE 114 initiates a group communication session by sending a SIP INVITE message to the application server 106, at 802. The group communication session involves UEs, including the UE 114 on the 3GPP EPS 102, and LMR UEs, including the LMR UE 504 on the LMR network 502. Responsive to the SIP INVITE, the application server 106, at 706, determines the active participants of the group communication session. The active participants include all active participants, such as the UE 114, on the 3GPP EPS 102, and the virtual active participant that represents a talk group on the LMR network 502. The talk group on the LMR network 502 includes the LMR UE 504, and has an assigned group priority. At 708, the application server 106 sends a PTT group call invite message that indicates the identification of each active participant of the group communication session to the centralized QoS entity 108. Additionally, the application server 106 indicates the assigned group priority for the group on the LMR network 502 in the signaling at 708.

At 710 and using the information obtained from the application server 106, the centralized QoS entity 108 determines an individual QoS setting for each active participant of the group communication session on the 3GPP EPS 102. Furthermore, the centralized QoS entity 108, at 710, applies a mapping function to the assigned group priority indicated in the signaling 708 to determine an individual QoS setting for the virtual active participant representing the talk group that includes the LMR UE 504. Additionally at 710, the centralized QoS entity 108 applies a QoS setting modification algorithm to modify the individual QoS setting for at least one of the active participants on the 3GPP EPS 102 based on the QoS setting for one or more of the other active participants. For example, the individual QoS setting for the UE 114 is modified based on the individual QoS setting for the virtual active participant.

At 318, the centralized QoS entity 108 request the 3GPP EPS 102 for the requisite number of bearers needed for the group communication session. Using signaling 320, the 3GPP EPS 102 sends a response to the centralized QoS entity 108 confirming successful establishment and/or modification of the bearer between the active participant (i.e. the UE 114) and the 3GPP EPS 102. Reactive to this response and using signaling 322, the centralized QoS entity 108 notifies the active participant (i.e. the UE 114) of the modified and/or established bearer and associated modified individual QoS settings that were applied to the bearers established between the UE 114 and the 3GPP EPS 102.

At 712, the centralized QoS entity 108 sends the application server 106 a PTT group call invite response message confirming successful initiation of the group communication session. Responsive to the signaling at 712, the application server 106, at 804, sends the LMR gateway 506 a SIP INVITE message requesting LMR UEs to join the group communication session. A SIP OK message is sent, at 806, to the application server 106 from the LMR gateway 506 in response to the SIP INVITE signaling sent at 804. The application server 106 acknowledges this SIP OK message by sending a SIP ACK message to the LMR gateway 506, at 808. At 718, the LMR gateway 506 notifies the LMR UE 504 that the LMR UE 504 has been approved to participate in the group communication session.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for managing QoS settings for group communications as described herein. The non-processor circuits may include, but are not limited to, a radio receiver, a radio transmitter, signal drivers, clock circuits, power source circuits, and user input devices. As such, these functions may be interpreted as steps of a method to perform the managing of QoS settings for group communications described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a non-transient computer-readable storage element or medium having computer readable code stored thereon for programming a computer (e.g. comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for managing quality of service (QoS) settings for group communications, the method comprising a centralized QoS entity performing:

determining a plurality of active participants of a group communication session;

determining, for each active participant, an individual QoS setting, including a first individual QoS setting for a first active participant and a second individual QoS setting for a second active participant;

modifying one of the first individual QoS setting and the second individual QoS setting based on a comparison of the first individual QoS setting to the second individual QoS setting, wherein modifying comprises changing one of the first individual QoS setting and the second individual QoS setting to the other of the first and second individual QoS settings, wherein the modified individual QoS setting is applied to a session leg used by the corresponding active participant during the group communication session, and wherein modifying one of the first individual QoS setting and the second individual QoS setting comprises performing one or more of:

determining that the first active participant is a recipient of media, determining that the second active participant is a source of the media, wherein the individual QoS setting for the second active participant has a highest QoS Class Identifier (QCI) among the individual QoS settings for all the active participants that are recipients of the media, and changing a QCI value for the first individual QoS setting to the highest QCI;

determining that the first active participant is a recipient of media, determining that the second active participant is a source of the media, wherein the individual QoS setting for the second active participant has a highest Allocation and Retention Priority (ARP) among the individual QoS settings for all the active participants that are recipients of the media, and changing an ARP value for the first individual QoS setting to the highest ARP;

determining that the first active participant is a source of media and all of the other active participants in the plurality of active participants are recipients of the media, determining that the second active participant has a highest QoS Class Identifier (QCI) among the individual QoS settings for the source and of all the other recipients, and changing a QCI value for the first individual QoS setting to the highest QCI; and determining that the first active participant is a source of media and all of the other active participants in the plurality of active participants are recipients of the media, determining that the second active participant has a highest Allocation and Retention Priority (ARP) among the individual QoS settings for the source and for all the other recipients, and changing an ARP value for the first individual QoS setting to the highest ARP.

2. The method of claim 1 further comprising:
receiving a change in the individual QoS setting for at least one of the active participants; and
modifying the individual QoS setting for another active participant based on the change in the individual QoS setting.

3. The method of claim 1 further comprising:
receiving a source change among the active participants; and
modifying the individual QoS setting for at least one active participant based on the source change.

4. The method of claim 1 further comprising:
determining that one of the active participants has left the group communication session; and
modifying the individual QoS setting for a remaining active participant based the individual QoS setting for at least one other remaining active participant.

5. The method of claim 1 further comprising:
determining that another active participant has joined the plurality of active participants of the group communication session;
determining an individual QoS setting for the active participant that joined the plurality of active participants; and
modifying the individual QoS setting for at least one of the plurality of active participants as a result of the another active participant joining the plurality of active participants.

6. The method of claim 1 further comprising:
requesting a wireless network to apply the modified individual QoS setting to the session leg used by the corresponding active participant.

7. The method of claim 6 further comprising notifying the corresponding active participant of the modified individual QoS setting.

8. The method of claim 1, wherein the first active participant operates on a first network and the second active participant operates on a second network that is a different type of network than the first network and wherein the first individual QoS setting is modified based on an individual QoS setting on the first network for the second active participant.

9. The method of claim 8, wherein the second active participant represents a group that has an assigned group priority on the second network, and wherein the individual QoS setting on the first network for the second active participant is determined by applying a mapping function to the assigned group priority on the second network.

10. The method of claim 1, wherein the second active participant corresponds to a communications group of a network different from the network serving the first active participant.

11. A non-transient computer-readable storage element having computer readable code stored thereon for programming a computer to perform a method for managing quality of service (QoS) settings for group communications, the computer readable code causing the computer to perform the following functions:

determining a plurality of active participants of a group communication session;

determining, for each active participant, an individual QoS setting, including a first individual QoS setting for a first active participant and a second individual QoS setting for a second active participant; and modifying one of the first individual QoS setting and the second individual QoS setting based on a comparison of the first individual QoS setting to the second individual QoS setting, wherein the modified individual QoS setting is applied to a session leg used by the corresponding active participant during the group communication session and wherein modifying the one of the first individual QoS setting and the second individual QoS setting comprises at least one of:

determining that the first active participant is a recipient of media, determining that the second active participant is a source of the media, wherein the individual QoS setting for the second active participant has a highest QoS Class Identifier (QCI) among the individual QoS settings for all the active participants that are recipients of the media, and changing a QCI value for the first individual QoS setting to the highest QCI;

determining that the first active participant is a recipient of media, determining that the second active participant is a source of the media, wherein the individual QoS setting for the second active participant has a highest Allocation and Retention Priority (ARP) among the individual QoS settings for all the active participants that are recipients of the media, and changing an ARP value for the first individual QoS setting to the highest ARP;

determining that the first active participant is a source of media and all of the other active participants in the plurality of active participants are recipients of the media, determining that the second active participant has a highest QoS Class Identifier (QCI) among the individual QoS settings for the source and of all the other recipients, and changing a QCI value for the first individual QoS setting to the highest QCI; and determining that the first active participant is a source of media and all of the other active participants in the plurality of active participants are recipients of the media, determining that the second active participant has a highest Allocation and Retention Priority (ARP) among the individual QoS settings for the source and for all the other recipients, and changing an ARP value for the first individual QoS setting to the highest ARP.

12. A method for managing quality of service (QoS) settings for group communications over heterogeneous networks, the method comprising:

at a centralized QoS entity:

determining a plurality of active participants of a group communication session, wherein the plurality of active participants includes a first active participant operating on a first network and a second participant that represents a group on a second network that is a different type of network than the first network, wherein the group has an assigned group priority on the second network;

determining, for each of the active participants, an individual QoS setting on the first network, including a first individual QoS setting for the first active participant and a second individual QoS setting for the second active participant, wherein the second individual QoS setting is determined by applying a mapping function to the assigned group priority; and modifying one of the first individual QoS setting and the second individual QoS setting based on a comparison of the first individual QoS setting to the second individual QoS setting, wherein modifying comprises changing one of the first individual QoS setting and the second individual QoS setting to the other of the first and second individual QoS settings, wherein the modified individual QoS setting is applied to a session leg used by the corresponding active participant during the group communication session, and wherein modifying one of the first individual QoS setting and the second individual QoS setting comprises performing one or more of:

determining that the first active participant is a recipient of media, determining that the second active participant is a source of the media, wherein the individual QoS setting for the second active participant has a highest QoS Class Identifier (QCI) among the individual QoS settings for all the active participants that are recipients of the media, and changing a QCI value for the first individual QoS setting to the highest QCI;

determining that the first active participant is a recipient of media, determining that the second active participant is a source of the media, wherein the individual QoS setting for the second active participant has a highest Allocation and Retention Priority (ARP) among the individual QoS settings for all the active participants that are recipients of the media, and changing an ARP value for the first individual QoS setting to the highest ARP;

determining that the first active participant is a source of media and all of the other active participants in the plurality of active participants are recipients of the media, determining that the second active participant has a highest QoS Class Identifier (QCI) among the individual QoS settings for the source and of all the other recipients, and changing a QCI value for the first individual QoS setting to the highest QCI; and determining that the first active participant is a source of media and all of the other active participants in the plurality of active participants are recipients of the media, determining that the second active participant has a highest Allocation and Retention Priority (ARP) among the individual QoS settings for the source and for all the other recipients, and changing an ARP value for the first individual QoS setting to the highest ARP.

13. The method of claim 12, wherein the first individual QoS setting comprises a first set of $3^{rd}$ Generation Partnership Project (3GPP) QoS parameters values, and applying the mapping function comprises converting the assigned group priority into a second set of 3GPP QoS parameter values.

14. The method of claim 13, wherein the first set of 3GPP QoS parameter values comprises a first QoS Class Identifier (QCI) value and a first Allocation and Retention Priority (ARP) value, and the second set of 3GPP QoS parameter values comprises a second QCI value and a second ARP value.

* * * * *